(12) United States Patent
Zhang

(10) Patent No.: US 11,907,078 B2
(45) Date of Patent: Feb. 20, 2024

(54) DATA BACKUP METHOD, APPARATUS, AND SYSTEM

(71) Applicant: HUAWEI TECHNOLOGIES CO., LTD., Guangdong (CN)

(72) Inventor: Lei Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 384 days.

(21) Appl. No.: 17/235,557

(22) Filed: Apr. 20, 2021

(65) Prior Publication Data

US 2021/0240578 A1 Aug. 5, 2021

Related U.S. Application Data

(63) Continuation of application No. PCT/CN2019/090090, filed on Jun. 5, 2019.

(30) Foreign Application Priority Data

Oct. 22, 2018 (CN) .......................... 201811232224.X
Nov. 28, 2018 (CN) .......................... 201811433033.X

(51) Int. Cl.
G06F 11/14 (2006.01)

(52) U.S. Cl.
CPC ...... G06F 11/1464 (2013.01); G06F 11/1435 (2013.01); G06F 11/1451 (2013.01); G06F 11/1469 (2013.01); G06F 2201/84 (2013.01)

(58) Field of Classification Search
CPC ............. G06F 11/1435; G06F 11/1451; G06F 11/1464; G06F 11/1469; G06F 2201/84
See application file for complete search history.

(56) References Cited

U.S. PATENT DOCUMENTS

| | | | |
|---|---|---|---|
| 6,279,011 B1 * | 8/2001 | Muhlestein | G06F 11/1464 714/E11.12 |
| 7,392,357 B2 * | 6/2008 | Ebata | G06F 11/1448 714/E11.13 |
| 9,569,124 B2 * | 2/2017 | Jain | G06F 16/13 |
| 2004/0268068 A1 | 12/2004 | Curran et al. | |
| 2016/0314046 A1 | 10/2016 | Kumarasamy | |
| 2018/0260281 A1 | 9/2018 | Monk | |
| 2019/0050296 A1 * | 2/2019 | Luo | G06F 11/1456 |

FOREIGN PATENT DOCUMENTS

| | | |
|---|---|---|
| CN | 103019888 A | 4/2013 |
| CN | 103034566 A | 4/2013 |
| CN | 104375904 A | 2/2015 |
| CN | 106095622 A | 11/2016 |
| CN | 107391314 A | 11/2017 |

\* cited by examiner

*Primary Examiner* — Joseph R Kudirka
(74) *Attorney, Agent, or Firm* — HUAWEI TECHNOLOGIES CO., LTD.

(57) ABSTRACT

In a data backup method, after data backup is triggered, a backup server sends a change information obtaining request to a file server to request change information of data on the file server. The backup server receives a data change record returned by a file server, wherein the data change record comprises identification information of a changed data block. The backup server then obtains data according to the data change record, backs up the obtained data, and establishes a data mapping relationship for the current backup. When data of a backup needs to be obtained, data of a corresponding data block is found in the backup storage device according to the data mapping relationship.

15 Claims, 6 Drawing Sheets

DATA BACKUP METHOD, APPARATUS, AND SYSTEM

CROSS-REFERENCE TO RELATED APPLICATIONS

This application is continuation of International Application No. PCT/CN2019/090090, filed on Jun. 5, 2019, which claims priority to Chinese Patent Application No. 201811232224.X, filed on Oct. 22, 2018, and Chinese Patent Application No. 201811433033.X, filed on Nov. 28, 2018. All of the aforementioned patent applications are hereby incorporated by reference in their entirety.

TECHNICAL FIELD

This application relates to the field of storage technologies, and in particular, to a data backup method, an apparatus, and a system.

BACKGROUND

In a network attached storage (Network Attached Storage, NAS) storage system, a file server is connected to an existing network to provide a file service. Currently, the file server is a device dedicated to the file service. The file server may be used to store and retrieve data, provide a file access function for an application and a client, and so on. To ensure data reliability, data in the file server is usually backed up. If a backup storage device is not provided by a manufacturer of the file server, backup is usually performed according to the following solution:

During the first backup, data in all files in a shared directory of the file server is obtained, and all the obtained data is stored in the backup storage device. When data in a file is changed, a list of files that are changed compared with the previous backup is obtained, and then the changed file is backed up to the backup storage device. In other words, the second backup and a subsequent backup are all incremental backups. As a quantity of backups increases, backed up data increases and occupies more storage space, resulting in deteriorated storage performance.

SUMMARY

This application provides a data backup method, a device, and a system, to reduce unnecessary duplicate data during backup storage.

According to a first aspect, an embodiment of this application provides a data backup method, and the method is performed by a backup server. The method includes: after a data backup is triggered, sending a change information obtaining request to a file server, where the change information obtaining request is used to request change information of data in the file server; receiving a record, of a data change between a second snapshot and a first snapshot, that is returned by the file server, where the first snapshot is created before the second snapshot, the data change record is used to record information about a data block corresponding to the change between the second snapshot and the first snapshot, and the data change record includes identification information of the changed data block; obtaining, from the file server based on the data change record, data in the data block identified by the identification information of the data block; and storing the obtained data in a backup storage device, and establishing a data mapping relationship for this backup, where the data mapping relationship includes identification information of all data blocks in the second snapshot, storage locations of all the data blocks in the second snapshot in the backup storage device, and a snapshot identifier of the second snapshot.

Optionally, the file server and the backup storage device are heterogeneous devices. The data mapping relationship may be stored in the backup storage device. The identification information of the data block includes a data block identifier and a file identifier of a file including the data block.

In this method, the obtained data change record is for a data block. Therefore, during an incremental backup, the data block corresponding to the change between the second snapshot and the first snapshot is obtained based on the data change record, and backup storage is performed on the data block. This is different from the prior art in which an entire file is backed up as long as data in the file is changed. In comparison, in the solution of this embodiment of the present invention, duplicate data during the incremental backup is reduced, and backup storage performance is improved.

With reference to the first aspect, in a possible implementation of the first aspect, the data change record further includes a corresponding operation identifier, and the establishing a data mapping relationship includes: copying a data mapping relationship established during a previous backup into the backup storage device, and modifying the copied data mapping relationship based on the data change record, to obtain the data mapping relationship for this backup.

With reference to the first aspect, in a second possible implementation of the first aspect, before the sending a change information obtaining request to a file server, the method further includes: sending a snapshot request to the file server; and receiving a snapshot creation success response returned by the file server, where the response includes the snapshot identifier of the second snapshot. If a backup is performed for a shared directory, the snapshot request herein may further include indication information of the shared directory. In this way, after receiving the snapshot request, the file server creates a snapshot for the shared directory. Compared with creating a snapshot for the entire file server, creating a snapshot for the shared directory is more targeted.

With reference to the second possible implementation of the first aspect, in a third possible implementation of the first aspect, the change information obtaining request includes the snapshot identifier of the second snapshot and a snapshot identifier of the first snapshot. The identifier of the first snapshot and the identifier of the second snapshot are used to indicate two snapshots between which information about the data change needs to be obtained by the file server. In this embodiment of this application, both the first snapshot and the second snapshot are created based on backups, and information about the data change between the two snapshots indicates a data change between the two backups.

According to a second aspect of this application, a data backup method is provided and is performed by a file server. The method includes: receiving a change information obtaining request sent by a backup server, where the change information obtaining request is used to request change information of data in the file server; determining the change information of the data in the file server, and returning a record of a data change between a second snapshot and a first snapshot to the backup server, where the first snapshot is created before the second snapshot, the data change record is used to record information about a data block corresponding to the change between the second snapshot and the first snapshot, and the data change record includes identification information of the changed data block; receiving a data obtaining request sent by the backup server, where the data obtaining request includes identification information of a to-be-obtained data block; and returning, to the backup server, data in the data block identified by the identification information of the data block.

Optionally, the change information obtaining request includes a snapshot identifier of the second snapshot and a snapshot identifier of the first snapshot. The identification information of the data block includes a data block identifier and a file identifier of a file including the data block.

The file server can provide a data block-level data change record, and return, to the backup server based on a request from the backup server, data in a data block corresponding to a change between two snapshots (that is, two backups), so that the backup server can implement a data block-level incremental backup, to avoid a repeated backup of data in some files.

With reference to the second aspect, in a first possible implementation, the method further includes: tracking a data operation performed by a client on the file server, and recording a record of a data change between two adjacent snapshots, where the record of the data change between the two adjacent snapshots includes identification information of a data block corresponding to the change between the two adjacent snapshots.

The file server tracks each data operation performed by the client on the file server and stores a record of a data change between two adjacent snapshots in a timely manner, so that the file server can provide an accurate data block-level data change record.

With reference to the first possible implementation of the second aspect, in a second possible implementation of the second aspect, when the second snapshot and the first snapshot are not adjacent snapshots, the method further includes: obtaining the record of the data change between the second snapshot and the first snapshot by combining records of data changes between every two adjacent snapshots between the second snapshot and the first snapshot.

Optionally, a method for obtaining the data change record through combination includes:

A data block that is generated before the first snapshot and that is deleted between the first snapshot and the second snapshot is marked as a deleted data block;

a data block that is generated before the first snapshot and that is changed between the first snapshot and the second snapshot is marked as a changed data block;

a data block that is generated after the first snapshot and that is deleted before the second snapshot is not recorded;

a data block that is generated after the first snapshot and that is not deleted before the second snapshot is marked as a newly added data block; and a data block that is changed after the first snapshot and that is not deleted before the second snapshot is marked as a changed data block.

According to a third aspect of this application, a backup server is provided. The backup server includes a block change list reader, a block data reader, and a block map organizer. The block change list reader is configured to: after a data backup is triggered, send a change information obtaining request to a file server, where the change information obtaining request is used to request change information of data in the file server; receive a record, of a data change between a second snapshot and a first snapshot, that is returned by the file server, where the data change record is used to record information about a data block corresponding to the change between the second snapshot and the first snapshot, the first snapshot is created before the second snapshot, and the data change record includes identification information of the changed data block. The block data reader is configured to obtain, from the file server based on the data change record, data of the data block identified by the identification information of the data block. The block map organizer is configured to: store the obtained data in a backup storage device, and establish a data mapping relationship for this backup, where the data mapping relationship includes identification information of all data blocks in the second snapshot, storage locations of all the data blocks in the second snapshot in the backup storage device, and a snapshot identifier of the second snapshot.

With reference to the third aspect, in a first possible implementation, the data change record further includes a corresponding operation identifier. That the block map organizer establishes the data mapping relationship includes: The block map organizer copies a data mapping relationship established during a previous backup into the backup storage device, and modifies the copied data mapping relationship based on the data change record, to obtain the data mapping relationship for this backup.

With reference to the third aspect, in a second possible implementation, the backup server further includes a snapshot trigger. The snapshot trigger is configured to: send a snapshot request to the file server, and receive a snapshot creation success response returned by the first device, where the response includes the snapshot identifier of the second snapshot.

According to a fourth aspect of this application, a file server is provided, and the file server is configured to provide a file service. The file server includes a file input/output tracker, a block change list provider, and a block data provider. The block change list provider is configured to: receive a change information obtaining request sent by a backup server, and send the change information obtaining request to the file input/output tracker, where the change information obtaining request is used to request change information of data in the file server. The file input/output tracker is configured to determine the change information of the data in the file server based on the change information obtaining request, and return a record of a data change between a second snapshot and a first snapshot to the backup server, where the data change record is used to record information about a data block corresponding to the change between the second snapshot and the first snapshot, and the data change record includes identification information of the changed data block. The block data provider is configured to receive a data obtaining request sent by the backup server, and return data of a corresponding data block to the backup server based on the data obtaining request, where the data obtaining request includes identification information of a to-be-obtained data block.

With reference to the fourth aspect, in a possible implementation, the file server further includes a snapshot creator and a storage unit. The snapshot creator is configured to: receive a snapshot creation request for creating the second snapshot, create the second snapshot based on the snapshot creation request, and indicate the file input/output tracker to store the record of the data change between the second snapshot and the first snapshot in the storage unit, where the first snapshot is a previous snapshot of the second snapshot. The file input/output tracker is further configured to: track a data operation of a client on the file server, and after receiving the indication sent by the snapshot creator, store the record of the data change between the second snapshot and the first snapshot in the storage unit based on the data operation.

According to a fifth aspect of this application, a server for implementing the first aspect and the second aspect is provided. The server includes a network interface, a processor, and a memory, and the network interface, the processor, and the memory are connected to each other through a bus. The network interface is configured to access a network, and the memory is configured to store a computer operation instruction. Specifically, the memory may be a high-speed RAM memory, or may be a non-volatile memory (non-volatile memory). The processor is configured to execute the computer operation instruction stored in the memory. The processor may be specifically a central processing unit (central processing unit, CPU), an application-specific integrated circuit (Application Specific Integrated Circuit, ASIC), or one or more integrated circuits configured to implement the embodiments of the present invention. The processor executes the computer operation instruction stored in the memory to perform the method in the first aspect or the second aspect.

According to a sixth aspect of this application, a backup system is provided. The system includes the backup server and the file server.

Optionally, the backup system further includes a backup storage device, and the backup storage device is configured to store data sent by the backup server.

According to a seventh aspect of this application, a storage medium is provided, and is used to store the computer operation instruction described in the fifth aspect. When the operation instruction is executed by a computer, the method in the first aspect or the second aspect may be performed.

BRIEF DESCRIPTION OF DRAWINGS

FIG. 2-1 is a schematic structural diagram of a file server according to an embodiment of the present invention;

FIG. 2-2 is another schematic structural diagram of a file server according to an embodiment of the present invention;

FIG. 2-3 is a schematic structural diagram of a backup server according to an embodiment of the present invention;

FIG. 2-4 is another schematic structural diagram of a backup server according to an embodiment of the present invention;

FIG. 3 is a schematic flowchart of a method according to an embodiment of the present invention;

FIG. 3-1 is a schematic diagram of data in a shared directory during a backup according to an embodiment of the present invention;

FIG. 3-2 is a schematic diagram of data in a shared directory during another backup according to an embodiment of the present invention; and FIG. 3-3 is a schematic diagram of a data mapping relationship according to an embodiment of the present invention.

DESCRIPTION OF EMBODIMENTS

Embodiments of the present invention provide a data backup method, an apparatus, and a system, so that change information of a data block can be tracked during a data operation, and only a changed data block is backed up during an incremental backup. Therefore, prior-art problems of low efficiency and a large backup storage waste that are caused by backing up a large amount of duplicated data is resolved. It should be noted that, for ease of description, a data block in the UNIX NFS protocol and a cluster in the windows CIFS protocol are collectively referred to as a data block.

Figure 1:
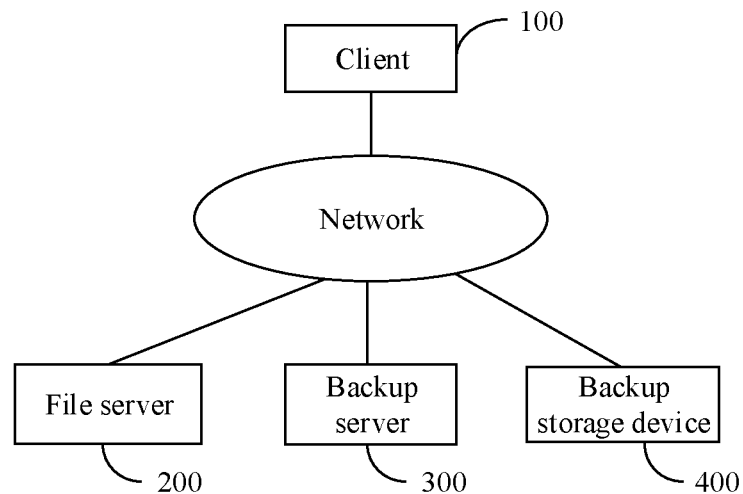
FIG. 1 is a schematic networking diagram of a backup system according to an embodiment of the present invention.

FIG. 1 is a schematic networking diagram of a backup system according to an embodiment of the present invention. The backup system includes a file server 200, a backup server 300, and a backup storage device 400. These devices communicate with each other through a network, and also communicate with a client 100 through the network. The file server 200 and the backup storage device 400 may be heterogeneous devices. For example, the file server 200 is a network-attached storage (network-attached storage, NAS) device, and the backup storage device 400 is a heterogeneous backup storage device of the NAS device. The backup storage device 400 and the file server 200 may be heterogeneous due to different manufacturers or different models.

Figures 1, 2:
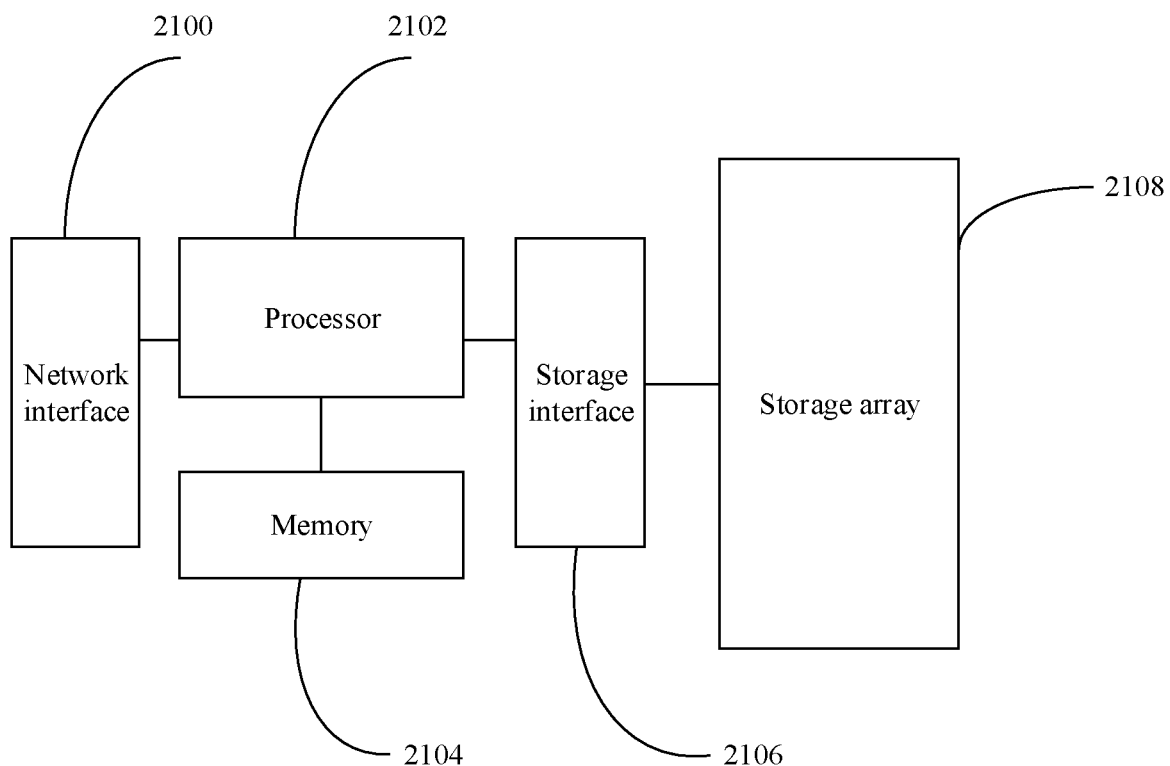
Figure 2:
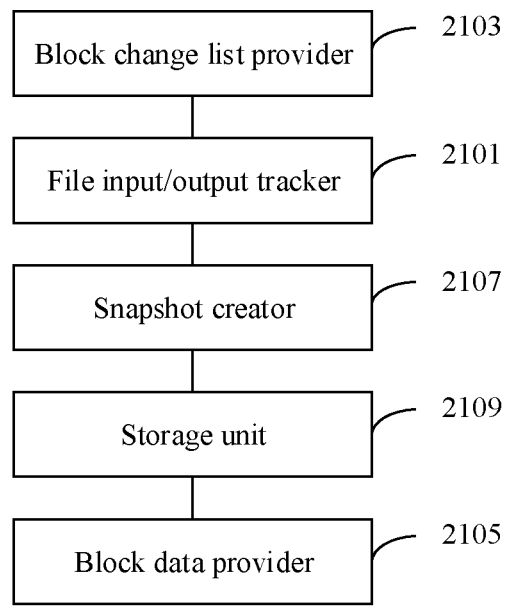

Referring to FIG. 2-1, the file server 200 includes a network interface 2100, a processor 2102, a memory 2104, a storage interface 2106, and a storage array 2108. The network interface 2100, the processor 2102, the memory 2104, and the storage interface 2106 are connected to each other through a bus. The storage interface and the storage array are communicatively connected to each other. The network interface 2102 may be provided by one or more network interface cards (Network Interface Card) and is configured to access a network. The storage interface 2108 is configured to connect to the storage array 2108. The storage array 2108 is configured to store data. The storage array 2108 may alternatively be replaced with another storage device. The memory 2104 stores some program instructions. When these instructions are executed by the processor 2102, the processor 2102 is configured to implement the following functions of the file server.

The file server 200 is configured to: receive a change information obtaining request sent by the backup server 300, where the change information obtaining request is used to request change information of data in the file server 200; determine the change information of the data in the file server 200, and return a record of a data change between a second snapshot and a first snapshot to the backup server, where the first snapshot is created before the second snapshot, the data change record is used to record information about a data block corresponding to the change between the second snapshot and the first snapshot, and the data change record includes identification information of the changed data block; receive a data obtaining request sent by the backup server 300, where the data obtaining request includes identification information of a to-be-obtained data block; and return, to the backup server 300, data of the data block identified by the identification information of the data block.

It may be understood that the program instruction stored in the memory 2104 may be logically divided into a plurality of subsets, and when one subset is executed by the processor 2102, the processor 2102 may be configured to implement a function of a component included in the file server 200. Referring to FIG. 2-2, in a specific implementation, the file server 200 includes a file input/output tracker 2101 (FileIO-Tracker), a block change list provider 2103 (BlockChgList-Provider), and a block data provider 2105 (BlockDataProvider).

The block change list provider 2103 is configured to: receive a change information obtaining request sent by the backup server, and send the change information obtaining request to the file input/output tracker, where the change information obtaining request is used to request change information of data in the file server.

The file input/output tracker 2101 is configured to: determine the change information of the data in the file server based on the change information obtaining request, and return a record of a data change between a second snapshot and a first snapshot to the backup server, where the data change record is used to record information about a data block corresponding to the change between the second snapshot and the first snapshot, and the data change record includes identification information of the changed data block.

The block data provider 2105 is configured to: receive a data obtaining request sent by the backup server, and return data of a corresponding data block to the backup server based on the data obtaining request, where the data obtaining request includes identification information of a to-be-obtained data block.

Optionally, the file server 200 further includes a snapshot creator 2107 and a storage unit 2109.

The snapshot creator 2107 is configured to: receive a snapshot creation request for creating the second snapshot, create the second snapshot based on the snapshot creation request, and indicate the file input/output tracker to store the record of the data change between the second snapshot and the first snapshot in the storage unit 2109, where the first snapshot is a previous snapshot of the second snapshot. The snapshot creator 2107 further returns a snapshot creation success response to the snapshot creator, where the response includes a snapshot identifier. In a specific implementation, the response message may further include a snapshot path, and the snapshot path is used to indicate a location of the snapshot in a NAS file system.

The file input/output tracker 2101 is further configured to: track a data operation of a client on the file server 200, and after receiving the indication sent by the snapshot creator, store the record of the data change between the second snapshot and the first snapshot in the storage unit 2109 based on the data operation.

It may be understood that a data block provided by the block data provider 2105 is stored in the storage unit 2109. The storage unit 2109 herein may be the storage array 2108 described above.

In a specific implementation, when the file server 200 sets a shared directory for the client, the client may create a file in the shared directory through the network, and may access a file in the shared directory and perform a read, write, delete, or change operation on data in the file. If data in the shared directory is backed up, the snapshot request includes indication information used to indicate a snapshot object, that is, indication information of the shared directory. After receiving the snapshot request, the snapshot creator 2107 creates a snapshot for the shared directory.

The file input/output tracker 2101 may track each file input/output request sent by the client 100 for a specified shared directory, and if a data block is added, a data block is deleted, or a data block is changed in the shared directory, record an identifier of a changed data block, a file identifier of a file including the changed data block, and a corresponding operation identifier. When the snapshot creator 2107 creates a snapshot, records of all changes between the current snapshot and a previous snapshot in the shared directory are stored in the storage unit as data change records. The current snapshot and the previous snapshot are two adjacent snapshots. The data change record includes a file identifier, a data block identifier, and an operation identifier (add, delete, or change). It may be understood that, during the first data backup, when a snapshot is created, there is no previous comparable snapshot. Therefore, there are the following two optional solutions. Solution 1: Assuming that a previous snapshot is a snapshot 0, the snapshot is compared with the snapshot 0, to obtain a data change record. Solution 2: A data change record is not recorded during the first backup, and only the snapshot is recorded. It may be understood that same data blocks are recorded in the two manners.

The change information provided by the block change list provider 2103 for the backup server 300 is usually a record of a data change between the current snapshot and the previous snapshot. The current snapshot, that is, the second snapshot, corresponds to this backup. The previous snapshot, that is, the first snapshot, corresponds to a previous backup. It is not difficult to understand that the second snapshot and the first snapshot may be two adjacent snapshots, or may be two non-adjacent snapshots. When a snapshot is created during the first data backup, there is no previous comparable snapshot. Therefore, the block change list provider 2103 may also have two different processing methods corresponding to the two different processing solutions of the file input/output tracker. Method 1: The block change list provider 2103 provides the data change record, as the change information, for the backup server based on the data change record returned by the file input/output tracker 2101. Method 2: The block change list provider 2103 returns, to the backup server, the change information returned by the file input/output tracker 2101. The change information in Method 2 is information about a file in the shared directory and information about a data block in the file that exist when the snapshot 1 is created and that are determined by the file input/output tracker 2101 based on the snapshot identifier carried in the change information obtaining request. In other words, in Method 2, the block change list provider 2103 returns, to the backup server 300, the determined information about the file and the determined information about the data block in the file as the change information.

Figures 2, 3:
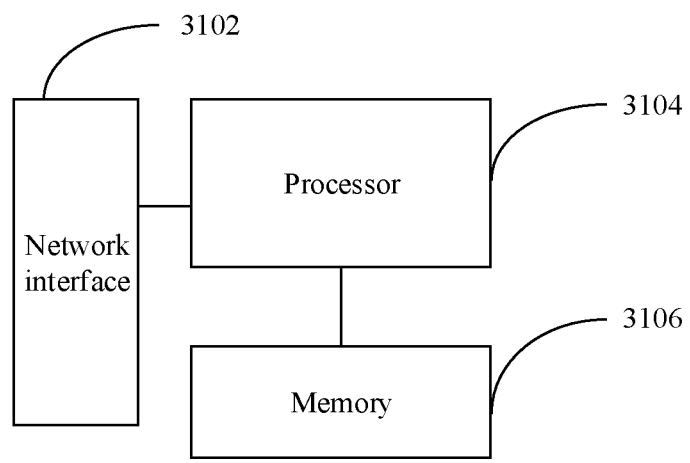

Referring to FIG. 2-3, the backup server 300 includes a network interface 3102, a processor 3104, and a memory 3106. The network interface 3102, the processor 3104, and the memory 3106 are connected through a bus. The network interface 3102 may be provided by one or more network interface cards (Network Interface Card) and is configured to access a network. The memory 3106 stores some program instructions. When these instructions are executed by the processor 3104, the processor 3104 is configured to implement the following functions of the backup server 300.

The backup server 300 is configured to: after a data backup is triggered, send a change information obtaining request to the file server 200, where the change information obtaining request is used to request change information of data in the file server 200; receive a record, of a data change between a second snapshot and a first snapshot, that is returned by the file server 200, where the first snapshot is created before the second snapshot, the data change record is used to record information about a data block corresponding to the change between the two snapshots, and the data change record includes identification information of the changed data block; obtain, from the file server 200 based on the data change record, data of the data block identified by the identification information of the data block; store the obtained data in the backup storage device 400; and establish a data mapping relationship for this backup, where the data mapping relationship includes identification information of all data blocks in the second snapshot, storage locations of the data blocks in the backup storage device, and a snapshot identifier of the second snapshot.

Figures 2, 3, 4:
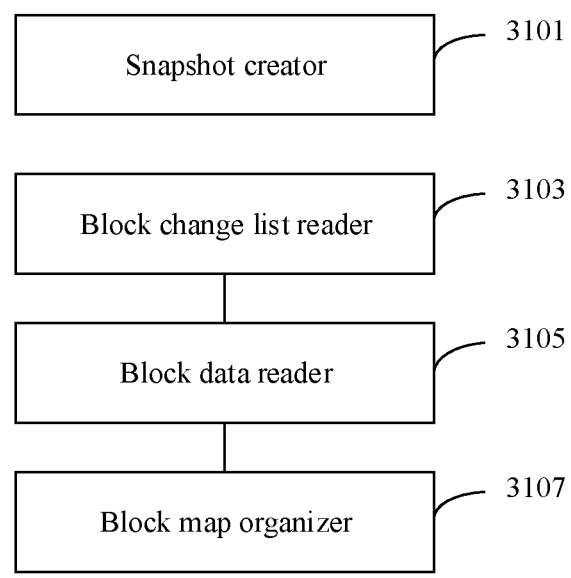
Figure 3:
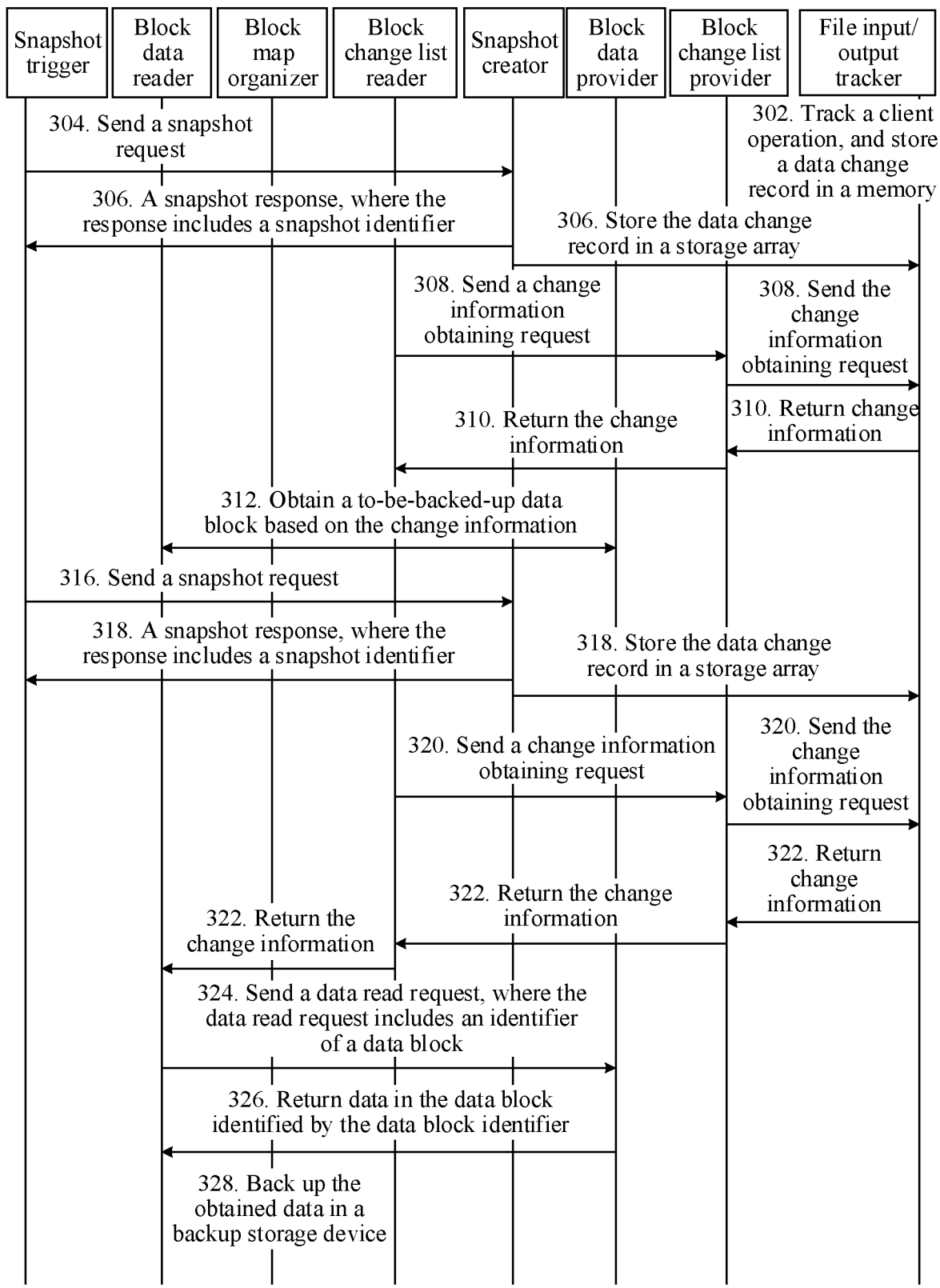
Figures 1, 3:
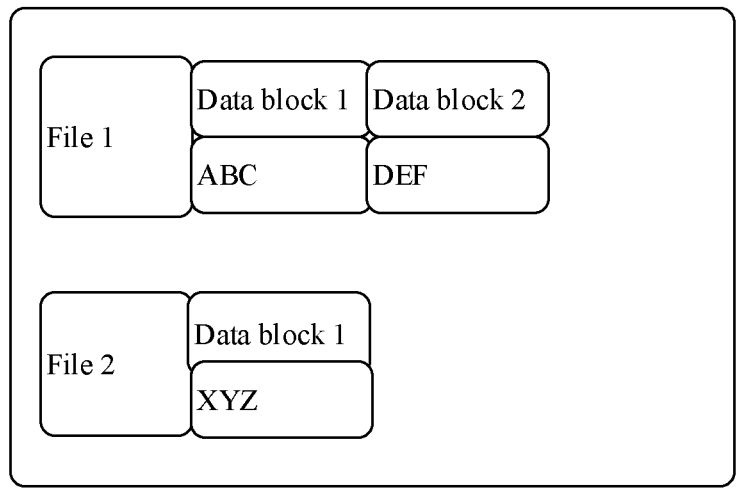
Figures 2, 3:
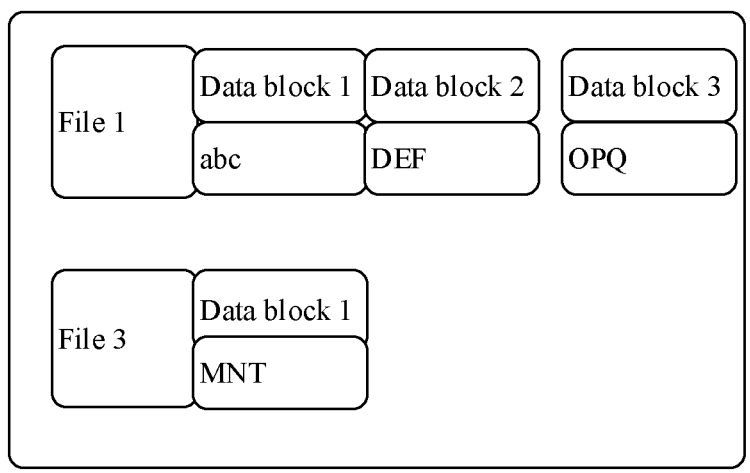
Figure 3:
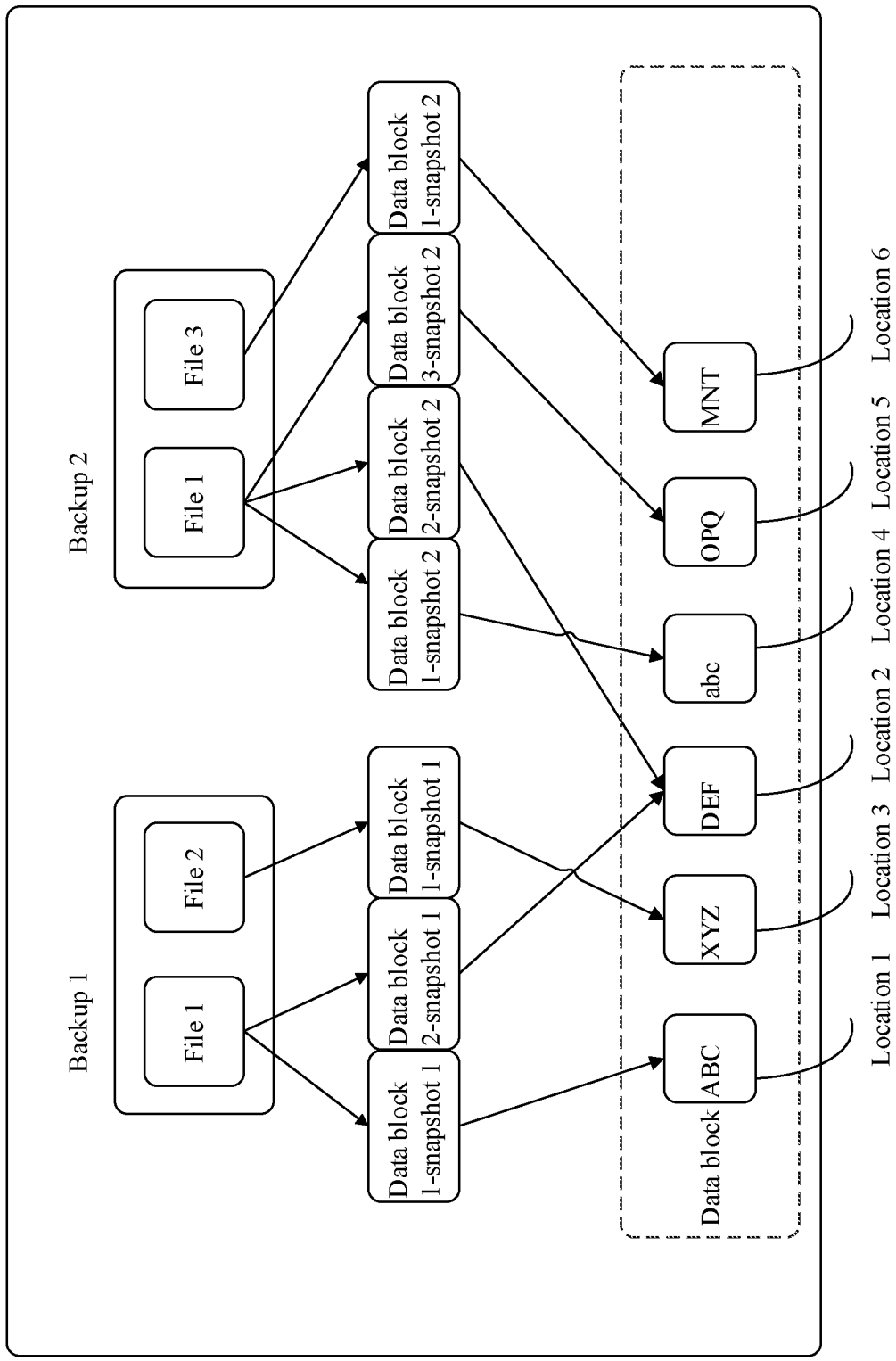

It may be understood that the program instruction stored in the memory 3106 may be logically divided into a plurality of subsets, and when each subset is executed by the processor, the processor may be configured to implement a function of each component included in the backup server. Referring to FIG. 2-4, in a specific implementation, the backup server 300 includes a block change list reader 3103 (BlockChgListReader), a block data reader 3105 (BlockDataReader), and a block map organizer 3107 (BlockMapOrganizer).

The block change list reader 3103 is configured to: after a data backup is triggered, send a change information obtaining request to the file server 200, where the change information obtaining request is used to request change information of data in the file server; and receive a record, of a data change between a second snapshot and a first snapshot, that is returned by the file server, where the data change record is used to record information about a data block corresponding to the change between the second snapshot and the first snapshot, the first snapshot is created before the second snapshot, and the data change record includes identification information of the changed data block. In a specific implementation, the request carries a snapshot identifier of a snapshot created during this backup and a snapshot identifier of a snapshot created during a previous backup. The snapshot created during this backup is the second snapshot, and the snapshot created during the previous backup is the first snapshot. If there is no information about a previous backup during the first backup, the change information obtaining request carries only the snapshot identifier of the snapshot created during this backup. If the backup is not performed for the first time, the change information obtaining request carries the snapshot identifier of the second snapshot and the snapshot identifier of the first snapshot. It may be understood that the second snapshot and the first block snapshot may be non-adjacent snapshots.

The block data reader 3105 is configured to obtain, from the file server 200 based on the data change record, data of the data block identified by the identification information of the data block. Optionally, the identification information of the data block may include a data block identifier and a file identifier of a file including the data block.

The block map organizer 3107 is configured to: store the obtained data in the backup storage device, and create a data mapping relationship for this backup, where the data mapping relationship includes identification information of all data blocks in the second snapshot, storage locations of all the data blocks in the second snapshot in the backup storage device, and the snapshot identifier of the second snapshot.

Optionally, the data change record further includes a corresponding operation identifier. That the block map organizer establishes the data mapping relationship includes: The block map organizer copies a data mapping relationship established during the previous backup into the backup storage device, and modifies the copied data mapping relationship based on the data change record, to obtain the data mapping relationship for this backup.

Optionally, the backup server further includes a snapshot trigger 3101. The snapshot trigger is configured to: send a snapshot request to the file server, and receive a snapshot creation success response returned by the first device, where the response includes the snapshot identifier of the second snapshot. The snapshot trigger receives the snapshot identifier of the second snapshot and forwards the snapshot identifier of the second snapshot to the block change list reader, and the block change list reader may store the received snapshot identifier. In this way, the data change record can be obtained based on this. The snapshot identifier may be stored in a plurality of manners. This is not limited in this embodiment of the present invention. It may be understood that, in a specific implementation, the snapshot trigger is configured to send the snapshot request to the snapshot creator when a preset condition is met. If the snapshot is backed up for a shared directory, the snapshot request includes indication information of the shared directory.

The backup storage device includes a data area used to store data and an area used to store the data mapping relationship for this backup. The backup storage device is a heterogeneous device of the file server, and may be a file server produced by a different manufacturer, or may be a storage device of a different type, for example, a storage area network (storage area network, SAN) device.

In the backup system in this embodiment of the present invention, each time the client performs an operation on the file server or a shared directory in the file server, change information of a data block in the file server or the shared directory is tracked. During an incremental backup, only a changed data block is provided for the backup server for backup. In this way, data of a data block that is not changed in the file is prevented from being repeatedly stored, thereby improving performance of the backup storage device. This also resolves a prior-art problem of a large backup storage waste.

Referring to FIG. 3, an embodiment of the present invention further provides a data backup method, and the method is applied to the foregoing backup system. If a shared directory shared with a client on a file server needs to be backed up, the client accesses a file in the shared directory, and may create a file in the shared directory, or read, write, or delete an existing file in the shared directory. Assuming that the shared directory in the file server is "//IP/MyShare/", the following uses an example of backing up data in the shared directory "//IP/MyShare/" in the file server to describe the implementation process of this embodiment of the present invention.

302. The file server receives a write input/output (Input/Output, I/O) request sent by the client, and determines, based on the write I/O, to write data to the shared directory //IP/My Share/.

Referring to FIG. 3-1, after a period of I/O operations, the shared directory includes a file 1 and a file 2. The file 1 includes a data block 1 and a data block 2, data written in the data block 1 is ABC, and data written in the data block 2 is DEF. The file 2 includes a data block 1, and data written in the data block 1 is XYZ.

Specifically, a FileIOTracker in the file server records, as a data change record, each operation (read, write, delete, or change) on the shared directory sent by the client. As shown in Table 1, the data change record includes an identifier of an operated data block, a file identifier of a file including the data block, and a corresponding operation identifier.

| File identifier | Data block identifier | Operation identifier |
| --- | --- | --- |
| File 1 | Data block 1 | Add |
| File 1 | Data block 2 | Add |
| File 2 | Data block 1 | Add |

Alternatively, an operation on data in the shared directory before the first backup may not be recorded.

304. When a preset condition is met, a backup server sends a snapshot request to the file server, where the snapshot request includes indication information used to indicate a snapshot object.

Specifically, in this step, a SnapTrigger in the backup server sends the snapshot request to a SnapCreator in the file server. The snapshot request includes indication information of a shared directory for which a snapshot is to be created. That is, the snapshot request includes NAS S hare="HIP/My S hare".

The preset condition may be set by a user as required. For example, the preset condition is set to a moment every day, and when the moment arrives, the preset condition is met. If a backup does not need to be performed for a specific shared directory, the snapshot request may alternatively not carry the indication information of the shared directory. As described in the foregoing embodiment, a backup may be performed for the entire file server, and therefore, the snapshot request may not carry the indication information for indicating the snapshot object. That is, a snapshot is created for the entire file server by default.

306. After creating the snapshot, the file server returns a snapshot creation success response to the backup server. The response includes a snapshot identifier. The success response may further include a snapshot path, and the snapshot path is used to indicate a location of the snapshot in a NAS file system. In this way, when content of the snapshot is required, the snapshot may be found according to the snapshot path.

Correspondingly, the SnapCreator returns the snapshot creation success response to the SnapTrigger. When the snapshot request includes NASShare="//IP/MyShare", the snapshot creation success response message may further include the snapshot path (NASShareSnapshot="HIP/MyShareSnap-1) and SnapshotID=Snap-1.

In this case, data recorded in a Snap-1 is the data shown in FIG. 3-1.

Optionally, as described above, the file server includes the Snapcreator and the FileIOTracker. A process of creating the snapshot by the file server may include: when receiving the snapshot request, the Snapereator creates the snapshot 1, and indicates the FileIOTracker to persistently store the data change record in a memory. Because this backup is the first backup, there is no previous comparable snapshot. It may be assumed that a previous snapshot is a snapshot After receiving the indication, the FileIOTracker stores, in a persistent disk such as a disk array in the file server, the data change record recorded in the memory, and marks the data change record as Snap0-1.

Alternatively, the data change record may not be recorded in the first snapshot, and only the snapshot is recorded. It may be understood that the Snap0-1 and the Snap-1 record some same data.

308. The backup server sends a change information obtaining request to the file server.

After the snapshot is created, the backup server determines a data range to be backed up during this backup. If data has never been backed up before this backup, all files in the shared directory are to be backed up. That is, a full backup is to be performed. In this case, a BlockChgListReader in the backup server sends the change information obtaining request to a BlocklistChgProvider in the file server. The request carries a snapshot identifier of the snapshot created during this backup and a snapshot identifier of a snapshot created during a previous backup. Because there is no information about the previous backup during the first backup, the change information obtaining request carries only the snapshot identifier Snap-1 of the snapshot created during this backup. With reference to the foregoing system embodiment, in another implementation, the change information obtaining request may carry the data change record Snap0-1 described in step 306.

310. The file server returns change information to the backup server.

Specifically, in this step, after receiving the change information obtaining request, the BlocklistChgProvider in the file server sends the change information obtaining request to the FileIOTracker. The FileIOTracker determines, based on the snapshot identifier in the change information obtaining request, the change information that needs to be returned. Because the received change information obtaining request carries only the snapshot identifier Snap-1, it can be learned that this backup is the first backup. In this case, it may be considered that all the files in the directory and data blocks in the files are newly added. The FileIOtracker determines, based on the Snap-1, information about the files in the shared directory and information about the data blocks in the files that exist when the snapshot 1 is created, and returns the determined information about the files and the determined information about the data blocks in the files to the backup server as the change information.

If the change information obtaining request carries the data change record Snap0-1, because the Snap0-1 and the Snap-1 record some same data, finally, information about the files in the shared directory and information about the data blocks in the files that exist when the snapshot 1 is created are also returned.

In this embodiment, the returned change information may be shown in Table 2, and includes file identifiers and corresponding data block identifiers.

TABLE 2

| File identifier | Data block identifier |
|---|---|
| File 1 | Data block 1 |
| File 1 | Data block 2 |
| File 2 | Data block 1 |

312. The backup server obtains data in to-be-backed-up data blocks based on the change information, stores the data in the to-be-backed-up data blocks in a backup storage device, and establishes a data mapping relationship for this backup.

Specifically, the Blockdatareader in the backup server sends a data read request to a BlockDataProvider in the file server. The data read request carries identification information of the data blocks indicated by the change information, namely, the data block identifiers and the file identifiers corresponding to the data blocks in Table 2. After receiving the data read request sent by the Blockdatareader, the BlockDataProvider in the file server returns data in the data block 1 and the data block 2 of the file 1 and data in the data block 1 of the file 2 to the Blockdatareader based on the file identifiers and the data block identifiers included in the data read request. The Blockdatareader sends the received data to a Blockmapognr in the backup server, and the Blockmapognr stores all the data in the files in a data area that is used to store data in the backup storage device, and creates the data mapping relationship for this backup in the backup storage device. The data mapping relationship includes the identifiers of all the data blocks in the snapshot of this backup, the file identifiers of the files including the data blocks, storage locations of the data blocks in the backup storage, and the snapshot identifier. It may be understood that a snapshot is first created during each backup. Therefore, the snapshot identifier may also be used to identify a data backup.

As shown in FIG. 3-3, during this data backup (backup 1), the data in the data block 1 and the data block 2 of the file 1 and the data in the data block 1 of the file 2, that is, ABC, DEF, and XYZ are stored in the data area. The data mapping relationship for this backup is shown in Table 3.

TABLE 3

| File identifier | Data block identifier | Storage location | Snapshot identifier |
| --- | --- | --- | --- |
| File 1 | Data block 1 | Location 1 | Snap-1 |
| File 1 | Data block 2 | Location 2 | Snap-1 |
| File 2 | Data block 1 | Location 3 | Snap-1 |

It should be noted that different storage devices have different specific representation forms of storage locations. For example, when the backup storage is object-based storage, the storage location may be a name of a bucket (bucket) and a URL address in the object-based storage. The bucket is similar to a folder, a storage object, and the like, and may include data and metadata used to describe the data.

314. The file server receives a write I/O request sent by the client, and determines, based on the write I/O, to write data to the shared directory //IP/MyShare/, delete data in the shared directory //IP/MyShare/, or change data in the shared directory //IP/MyShare/.

After the first backup, the file server continues to receive a write I/O operation. After a period of time, as shown in FIG. 3-2, the files in the shared directory are changed as follows: In the file 1, the data in the block 1 is changed to abc, a block 3 is added, and data in the block 3 is OPQ. The file 2 is deleted. A file 3 is added, and a block 1 in the file 3 stores data MNT.

Specifically, after recording the Snap-1, the FileIOTracker in the file server uses, as a data change record, each operation (read, write, delete, or change) on the shared directory sent by the client. As shown in Table 1, the data change record includes an identifier of an operated data block, a file identifier of a file including the data block, and a corresponding operation identifier.

316. The backup server sends a snapshot request to the file server, where the snapshot request includes indication information used to indicate a snapshot object.

When the condition for performing a backup is met again, the backup server performs a backup again. Similarly, in this step, the SnapTrigger in the backup server sends the snapshot request to the SnapCreator in the file server. The snapshot request includes a path of the shared directory for which a snapshot is to be created, that is, NASShare="//IP/MyShare" in this embodiment.

318. After creating the snapshot, the file server returns a snapshot creation success response to the backup server, where the response includes a snapshot path and a snapshot ID.

Correspondingly, when the snapshot request includes NASShare="//IP/MyShare", the snapshot creation success response message may also include the snapshot path (NASShareSnapshot="HIP/MyShareSnap-2) and SnapshotID=Snap-2.

The FileIOTracker in the file server stores, in the memory, a record of a data change between this snapshot and the previous snapshot in the shared directory. The data change record is used to record information about data corresponding to a change between two adjacent snapshots, and the data change record includes a file identifier, a data block identifier, and a corresponding operation identifier (which may be change, add, and delete). In this step, the data change record is a record of a data change between the Snap-1 and the Snap-2, as shown in Table 4.

TABLE 4

| File identifier | Data block identifier | Operation identifier |
| --- | --- | --- |
| File 1 | Data block 1 | Change |
| File 1 | Data block 3 | Add |
| File 2 | Data block 1 | Delete |
| File 3 | Data block 1 | Add |

As described above, the file server includes the Snapereator and the FileIOTracker. A process of creating the snapshot by the file server may include:

When receiving the snapshot request, the Snapereator creates a snapshot 2, and indicates the FileIOTracker to persistently store the data change record in the memory. After receiving the indication, the FileIOTracker stores the data change record recorded in the memory in a persistent storage device such as a disk array in the file server, and marks the data change record as Snap1-2. In this case, data recorded in the snapshot 2 is the data shown in FIG. 3-2.

320. The backup server sends a change information obtaining request to the file server.

After the snapshot is created, the backup server determines a data range to be backed up during this backup. There is a backup record before this backup. Therefore, this backup is an incremental backup, and the data corresponding to the change between this backup and the previous backup needs to be determined. It can be understood that, because a snapshot is first created during each data backup, the data change between this backup and the previous backup is reflected by differential data between the Snap-2 and the Snap-1.

In a specific implementation, the BlockChgListReader in the backup server sends the change information obtaining request to the BlocklistChgProvider in the file server, to request information about the data change between the Snap-1 and the Snap-2.

322. The file server returns the change information to the backup server.

Specifically, in this step, after receiving the change information obtaining request sent by the BlockChglistReader, the BlocklistChgProvider forwards the change information obtaining request to the FileIOTracker in the file server. The FileIOTracker obtains the previously stored data change record Snap1-2 from the persistent storage device, and returns the data change record to the BlocklistChgProvider. The BlocklistChgProvider returns the data change record Snap1-2 to the BlockChglistReader in the backup server.

324. The backup server sends a data read request to the file server based on the obtained change information, where the data read request carries identification information of data blocks that need to be read.

Specifically, if the returned change information is the data change record Snap1-2, the Blockdatareader in the backup server determines, based on the data change record Snap1-2, that the data in the block-1 and the block-3 of the file 1 and the data in the block-1 of the file 3 are to be backed up. Then, the Blockdatareader sends the data read request to the BlockDataProvider in the file server. The data read request carries data block identifiers and file identifiers corresponding to these data blocks.

326. The file server returns, to the backup server based on the identification information of the data blocks in the data read request, data in the data blocks identified by the identification information of the data blocks.

Specifically, in this step, after receiving the data read request sent by the Blockdatareader, the BlockDataProvider in the file server returns the data in the block 1 and the block 3 of the file 1 and the data in the block 1 of the file 3 to the Blockdatareader based on the file identifiers and the data block identifiers included in the data read request.

328. The backup server stores the obtained data in the backup storage, and establishes a data mapping relationship for this backup.

Specifically, in this step, the Blockmapognr in the backup server stores the obtained data in the data area used to store data in the backup storage device, and creates the data mapping relationship for this backup in the backup storage device. The data mapping relationship includes identifiers of all data blocks in the snapshot of this backup, file identifiers of files including the data blocks, storage locations of the data blocks in the backup storage, and the snapshot identifier.

A process of creating the data mapping relationship for this backup includes: copying the data mapping relationship established during the previous backup into the backup storage device, and modifying, based on the data change record, the copied data mapping relationship established during the previous backup. A modified data mapping relationship is the data mapping relationship for this backup.

As shown in FIG. 3-3, during this data backup, the data in the data block 1 and the data block 3 of the file 1 and the data in the data block 1 of the file 3, that is, abc, OPQ, and MNT are stored in the data area. The data mapping relationship for this backup is shown in Table 5.

TABLE 5

| File identifier | Data block identifier | Storage location | Snapshot identifier |
| --- | --- | --- | --- |
| File 1 | Data block 1 | Location 4 | Snap-2 |
| File 1 | Data block 2 | Location 2 | Snap-2 |
| File 1 | Data block 3 | Location 5 | Snap-2 |
| File 3 | Data block 1 | Location 6 | Snap-2 |

It may be understood that, because data block identifiers in different files may be the same, a data block should be uniquely identified by a data block identifier and a file identifier of a file including the data block. The data block identifier and the file identifier of the file including the data block are summarized as identification information of the data block. The identification information of the data block may also be implemented in another manner, which is not limited in this embodiment of the present invention.

It may be understood from the figure that, in this embodiment, because the data block 1 and the data block 3 in the file 1 change between this backup and the previous backup, the block-1 and the block-3 are backed up again. However, because the data block 2 in the file 1 does not change in this period, in this incremental backup, the data block 2 in the file 1 is not backed up, and the data block is not transmitted between the backup server and the file server. If the data block 2 in the file 1 in the snapshot 2 needs to be read, a location 2 may be found according to Table 4, to read data in the data block 2. In addition, because the data block 1 in the file 2 has been deleted, the data block 1 is not in the snapshot of this backup. Because an operation identifier of the data block is deleted, the data mapping relationship for this backup does not include information about the data block.

It can be understood that, backed up data is not data in two consecutive snapshots in some scenarios. For example, if the second backup in the foregoing embodiment fails, a snapshot Snapshot-3 is created in the third backup, and differential data between the Snap-1 and the Snapshot-3 needs to be backed up. In this case, the BlockChglistReader in the backup server sends, to the BlocklistChgProvider in the file server, a request for obtaining information about a change between the Snap-1 and the Snapshot-3.

Correspondingly, in step 322, after receiving the request, sent by the BlockChglistReader, for obtaining the information about the change between the Snap-1 and the Snap-3, the BlocklistChgProvider forwards, to the FileIOTracker in the file server, the request for obtaining the information about the change between the Snap-1 and the Snap-3. The FileIOTracker obtains previously stored data change records Snap1-2 and Snap2-3 from the persistent storage device, and returns the Snap1-2 and the Snap2-3 to the BlocklistChgProvider. The BlocklistChgProvider obtains a data change record Snap1-3 by combining the data change records Snap1-2 and Snap2-3. An example of a specific combination method is as follows:

(1) A data block that is generated before the Snap-1 and that is deleted between the Snap-2 and the Snap-3 is marked as a deleted data block.

(2) A data block that is generated before the Snap-1 and that is changed between the Snap-2 and the Snap-3 is marked as a changed data block.

(3) A data block that is generated before the Snap-1 and that is deleted between the Snap-1 and the Snap-2 is marked as a deleted data block.

(4) A data block that is generated before the Snap-1, changed between the Snap-1 and the Snap-2, but not deleted between the Snap-2 and the Snap-3 is marked as a changed data block.

(5) A data block that is generated after the Snap-1 and that is deleted between the Snap-2 and the Snap-3 does not need to be recorded in the Snap1-3.

(6) A data block that is generated after the Snap-1 and that is not deleted between the Snap-2 and the Snap-3 is recorded as a newly added data block in the Snap1-3.

(7) A data block that is changed after the Snap-1 and that is not deleted between the Snap-2 and the Snap-3 is marked as a changed data block in the Snap1-3 regardless of whether the data block is changed between the Snap-2 and the Snap-3.

After obtaining the Snap1-3, the BlocklistChgProvider returns the data change record Snap1-3 to the BlockChglistReader, and the BlockChglistReader sends the data change record to the Blockdatareader in the backup server.

Correspondingly, in step 324, if the returned change information is the data change record Snap1-3, the Blockdatareader in the backup server determines, based on the data change record Snap1-3, data blocks storing data that needs to be backed up, and uses the data read request sent to the file server to carry data block identifiers corresponding to these data blocks. According to the foregoing method, change information of a data block can be tracked during a data backup. Therefore, only the changed data block is backed up during an incremental backup. In this way, a backup of a large amount of repeated data is avoided, thereby resolving a prior-art problem of a large backup storage waste.

It should be noted that, division into the components in the backup server in the foregoing embodiment is merely an example, and this is not limited. The interaction between internal components may be a transfer of actual data or signals. For example, after the step in which the Blockdatareader receives the data returned by the Blockdataprovider, a mirror relationship may be established between the Blockmapognr and the backup storage device, and a mirror of data obtained by the Blockdatareader is stored in the backup storage device.

A person of ordinary skill in the art may understand that each aspect of the present invention or the possible implementation of each aspect may use a form of a computer program product. The computer program product is computer readable program code stored in a computer readable medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM), and an optical disc. A processor in a computer reads the computer readable program code stored in the computer readable medium, so that the processor can perform a function action specified in each step or a combination of steps in the flowchart. All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data backup method performed by a backup server, comprising:

sending a snapshot request to a file server;
receiving a snapshot creation success response returned by the file server, wherein the snapshot creation response comprises a snapshot identifier of a second snapshot;
after a data backup operation is triggered, sending a change information obtaining request to the file server to request for change information of data in the file server;
receiving, from the file server, a record of a data change between the second snapshot and a first snapshot made before the second snapshot, wherein the data change record records information about a data block corresponding to the data change between the second snapshot and the first snapshot, and the data change record includes identification information of the data block corresponding to the data change;
obtaining, from the file server based on the data change record, data in the data block identified by the identification information of the data block;
storing the obtained data in a backup storage device; and
establishing a data mapping relationship for the data backup operation, wherein the data mapping relationship includes identification information of all data blocks in the second snapshot, storage locations of all the data blocks in the second snapshot in the backup storage device, and a snapshot identifier of the second snapshot.

2. The method according to claim 1, wherein the data change record further includes a corresponding operation identifier, and establishing the data mapping relationship further comprises:

copying a data mapping relationship established during a previous backup into the backup storage device; and
modifying the copied data mapping relationship based on the data change record, to obtain the data mapping relationship for the data backup operation.

3. The method according to claim 1, wherein the file server and the backup storage device are heterogeneous.

4. The method according to claim 1, further including:
storing the data mapping relationship in the backup storage device.

5. The method according to claim 1, wherein the identification information of the data block comprises a data block identifier and a file identifier of a file including the data block.

6. A data backup method performed by a backup server, comprising:

after a data backup operation is triggered, sending a change information obtaining request to a file server to request for change information of data in the file server, wherein the change information obtaining request comprises a snapshot identifier of a second snapshot and a snapshot identifier of a first snapshot made before the second snapshot;
receiving, from the file server, a record of a data change between the second snapshot and the first snapshot, wherein the data change record records information about a data block corresponding to the data change between the second snapshot and the first snapshot, and the data change record includes identification information of the data block corresponding to the data change;
obtaining, from the file server based on the data change record, data in the data block identified by the identification information of the data block;
storing the obtained data in a backup storage device; and
establishing a data mapping relationship for the backup operation, wherein the data mapping relationship includes identification information of all data blocks in the second snapshot, storage locations of all the data blocks in the second snapshot in the backup storage device, and a snapshot identifier of the second snapshot.

7. A data backup method performed by a file server, comprising:
receiving, from a backup server, a snapshot request;
sending, to the backup server, a snapshot creation success response comprising a snapshot identifier of a second snapshot;
receiving, from the backup server, a change information obtaining request requesting for change information of data in the file server;
determining the change information of the data in the file server;
returning a record of a data change between the second snapshot and a first snapshot to the backup server, wherein the first snapshot is created before the second snapshot, the data change record is used to record information about a data block corresponding to the data change between the second snapshot and the first snapshot, and the data change record includes identification information of the data block corresponding to the data change;
receiving a data obtaining request sent by the backup server, wherein the data obtaining request includes identification information of a to-be-obtained data block; and
returning, to the backup server, data in the to-be-obtained data block.

8. The method according to claim 7, further comprising:
tracking a data operation performed by a client on the file server; and
recording a record of a data change between two adjacent snapshots, wherein the record of the data change between the two adjacent snapshots includes identification information of a data block corresponding to the data change between the two adjacent snapshots.

9. The method according to claim 8, wherein the second snapshot and the first snapshot are not adjacent snapshots, and wherein the method further comprises:
obtaining the record of the data change between the second snapshot and the first snapshot by combining records of data changes between every two adjacent snapshots between the second snapshot and the first snapshot.

10. A backup server comprising:
a network interface for accessing a network;
a memory storing executable instructions; and
a processor configured to execute the executable instructions to:
send a snapshot request to a file server;
receive a snapshot creation success response returned by the file server, wherein the response includes a snapshot identifier of a second snapshot;
after a data backup operation is triggered, send a change information obtaining request to the file server to request for change information of data in the file server;
receive, from the file server, a record of a data change between the second snapshot and a first snapshot taken before the second snapshot, wherein the data change record records information about a data block corresponding to the data change between the second snapshot and the first snapshot, and the data change record includes identification information of the data block corresponding to the data change;
obtain, from the file server based on the data change record, data in the data block identified by the identification information of the data block;
store the obtained data in a backup storage device; and
establish a data mapping relationship for the data backup operation, wherein the data mapping relationship includes identification information of all data blocks in the second snapshot, storage locations of all the data blocks in the second snapshot in the backup storage device, and a snapshot identifier of the second snapshot.

11. The backup server according to claim 10, wherein the data change record further comprises a corresponding operation identifier, and the instructions further cause the backup server to be configured to:
copy a data mapping relationship established during a previous backup into the backup storage device, and modify the copied data mapping relationship based on the data change record, to obtain the data mapping relationship for the data backup operation.

12. A file server comprising:
a network interface for accessing a network;
a memory storing executable instructions; and
a processor configured to execute the executable instructions to:
receive, from a backup server, a snapshot request;
send, to the backup server, a snapshot creation success response comprising a snapshot identifier of a second snapshot;
receive, from the backup server, a change information obtaining request requesting for change information of data in the file server;
determine the change information of the data in the file server;
return a record of a data change between the second snapshot and a first snapshot to the backup server, wherein the first snapshot is created before the second snapshot, the data change record is used to record information about a data block corresponding to the data change between the second snapshot and the first snapshot, and the data change record includes identification information of the data block corresponding to the data change;
receive a data obtaining request sent by the backup server, wherein the data obtaining request includes identification information of a to-be-obtained data block; and
return, to the backup server, data in the to-be-obtained data block.

13. The file server according to claim 12, wherein the instructions further cause the file server to be configured to:
track a data operation performed by a client on the file server; and
record a record of a data change between two adjacent snapshots, wherein the record of the data change between the two adjacent snapshots includes identification information of a data block corresponding to the data change between the two adjacent snapshots.

14. The file server according to claim 13, wherein the second snapshot and the first snapshot are not adjacent snapshots, and the instructions further cause the file server to be configured to:
obtain the record of the data change between the second snapshot and the first snapshot by combining records of data changes between every two adjacent snapshots between the second snapshot and the first snapshot.

15. A backup system comprising:
a file server;
a backup server; and
a backup storage device,
wherein the backup server is configured to:
- send a snapshot request to the file server;
- receive a snapshot creation success response returned by the file server, wherein the response includes a snapshot identifier of a second snapshot;
- after a data backup operation is triggered, send a change information obtaining request to the file server to request for change information of data in the file server;
- receive from the file server, a record of a data change between the second snapshot and a first snapshot taken before the second snapshot, wherein the data change record records information about a data block corresponding to the data change between the second snapshot and the first snapshot, and the data change record includes identification information of the data block corresponding to data change;
- obtain, from the file server based on the data change record, data in the data block identified by the identification information of the data block;
- store the obtained data in the backup storage device; and
- establish a data mapping relationship for the backup operation, wherein the data mapping relationship includes identification information of all data blocks in the second snapshot, storage locations of data blocks in the second snapshot in the backup storage device, and a snapshot identifier of the second snapshot.

* * * * *